United States Patent
Wu

(10) Patent No.: US 9,463,840 B1
(45) Date of Patent: Oct. 11, 2016

(54) BICYCLE COMPONENT WITH REINFORCED STRUCTURE AND MANUFACTURING METHOD THEREOF

(71) Applicant: Louis Liu, Taichung (TW)

(72) Inventor: Bill Wu, Taichung (TW)

(73) Assignee: Louis Liu, Taichung (TW)

( * ) Notice: Subject to any disclaimer, the term of this patent is extended or adjusted under 35 U.S.C. 154(b) by 5 days.

(21) Appl. No.: 14/695,676

(22) Filed: Apr. 24, 2015

(51) Int. Cl.
| | |
|---|---|
| *B62K 3/00* | (2006.01) |
| *B62K 19/28* | (2006.01) |
| *B62K 21/04* | (2006.01) |
| *B29C 49/02* | (2006.01) |
| *B29C 49/00* | (2006.01) |
| *B29C 70/68* | (2006.01) |
| *B29C 70/46* | (2006.01) |
| *B29K 105/04* | (2006.01) |
| *B29K 105/08* | (2006.01) |
| *B29K 307/04* | (2006.01) |
| *B29L 31/30* | (2006.01) |

(52) U.S. Cl.
CPC ........... *B62K 21/04* (2013.01); *B29C 49/0005* (2013.01); *B29C 49/02* (2013.01); *B29C 70/467* (2013.01); *B29C 70/68* (2013.01); *B29C 2049/028* (2013.01); *B29K 2105/04* (2013.01); *B29K 2105/0872* (2013.01); *B29K 2307/04* (2013.01); *B29L 2031/3091* (2013.01); *B62K 19/28* (2013.01)

(58) Field of Classification Search
None
See application file for complete search history.

(56) References Cited

U.S. PATENT DOCUMENTS

| | | | | |
|---|---|---|---|---|
| 5,016,895 | A * | 5/1991 | Hollingsworth | B62K 21/02 264/258 |
| 5,080,385 | A * | 1/1992 | Duplessis | B29C 70/342 264/258 |
| 6,267,399 | B1 * | 7/2001 | Buckmiller | B29C 53/824 280/274 |
| 6,270,104 | B1 * | 8/2001 | Nelson | B29C 70/446 280/281.1 |
| 7,503,576 | B1 * | 3/2009 | Schroeder | B62K 19/16 280/276 |
| 7,597,338 | B2 * | 10/2009 | I | B62K 19/16 280/274 |

* cited by examiner

*Primary Examiner* — Tony Winner
(74) *Attorney, Agent, or Firm* — Muncy, Geissler, Olds & Lowe, P.C.

(57) ABSTRACT

A bicycle component with reinforced structure and a manufacturing method thereof are disclosed. The bicycle component includes a hollow main body and a foam material. The main body is manufactured by stacking plural carbon fiber prepreg layers and provided with a force bearing area. The foam material is disposed on the force bearing area and wrapped by the carbon fiber prepreg layers. Therefore, the present invention improves the structural strength of the bicycle component, lightens the weight of a bicycle made of the bicycle components, and provides a greater controllability of the bicycle.

5 Claims, 5 Drawing Sheets

BICYCLE COMPONENT WITH REINFORCED STRUCTURE AND MANUFACTURING METHOD THEREOF

BACKGROUND OF THE INVENTION

1. Field of the Invention

The present invention relates to bicycle components, and more particularly, to a bicycle component with reinforced structure and a manufacturing method thereof.

2. Description of the Related Art

In order to achieve a lighter weight of a bicycle, most of bicycle-related industries have already used carbon fiber composites to manufacture bicycle components, such as frames, front forks, handlebars, vertical pipes, seat tubes, cranks, and rims, so as to satisfy the demands of consumers.

The force bearing area of each bicycle component mostly locates on a turning or bending section, resulting in stress concentration, thereby causing structure damages and further affecting normal usage. Therefore, to overcome such problems, bicycle-related industries increase the thickness of the force bearing area to improve the structural strength thereof, and also increase the cross-sectional square measure of such area, whereby the stiffness and shock absorbing capability of the force bearing area are enhanced.

However, the aforementioned method leads to excessive usage of materials, raising the material and manufacturing cost. Moreover, thickness increasing of the force bearing area results in whole component weight gaining, while the moment of inertia is also increased. As a result, when riding the bicycle, riders may face difficulty of operation which is disadvantageous during bicycle controlling.

SUMMARY OF THE INVENTION

For improving aforementioned issues, the present invention discloses a bicycle component with reinforced structure and a manufacturing method thereof. The bicycle component applies a foam material wrapped by the carbon fiber prepreg layers, and the foam material is disposed on the force bearing area, so as to enhance the structural strength of the bicycle component.

For achieving the objective above, the present invention provides a bicycle component with reinforced structure, comprising:

a hollow main body, manufactured by stacking plural carbon fiber prepreg layers and provided with a force bearing area; and a foam material, disposed on the force bearing area and wrapped by the carbon fiber prepreg layers.

Therefore, with the foam material, the structural strength and the cross-sectional square measure of the bicycle component are improved, so as to acquire the capability of shock absorption and impact resistance. Also, compared with the conventional structure, it is unnecessary to adopt excessive carbon fiber composites on the force bearing area, thus lowering the material cost and decreasing the weight of the whole component. As a result, the present invention avoids increasing the moment of inertia of the bicycle component, facilitating the bicycle controllability.

Furthermore, for achieving the objective above, the present invention provides a manufacturing method of bicycle component with reinforced structure, comprising following steps:

a. preparing a foam material;

b. stacking plural carbon fiber prepreg layers to produce a semi-product of the bicycle component having a force bearing area;

c. placing the foam material on the force bearing area of the semi-product, and coating and wrapping the foam material with the carbon fiber prepreg layers; and d. hot-pressing and blow molding the semi-product with the foam material by use of a mold, so that a bicycle component is acquired.

DETAILED DESCRIPTION OF THE INVENTION

Figure 1:
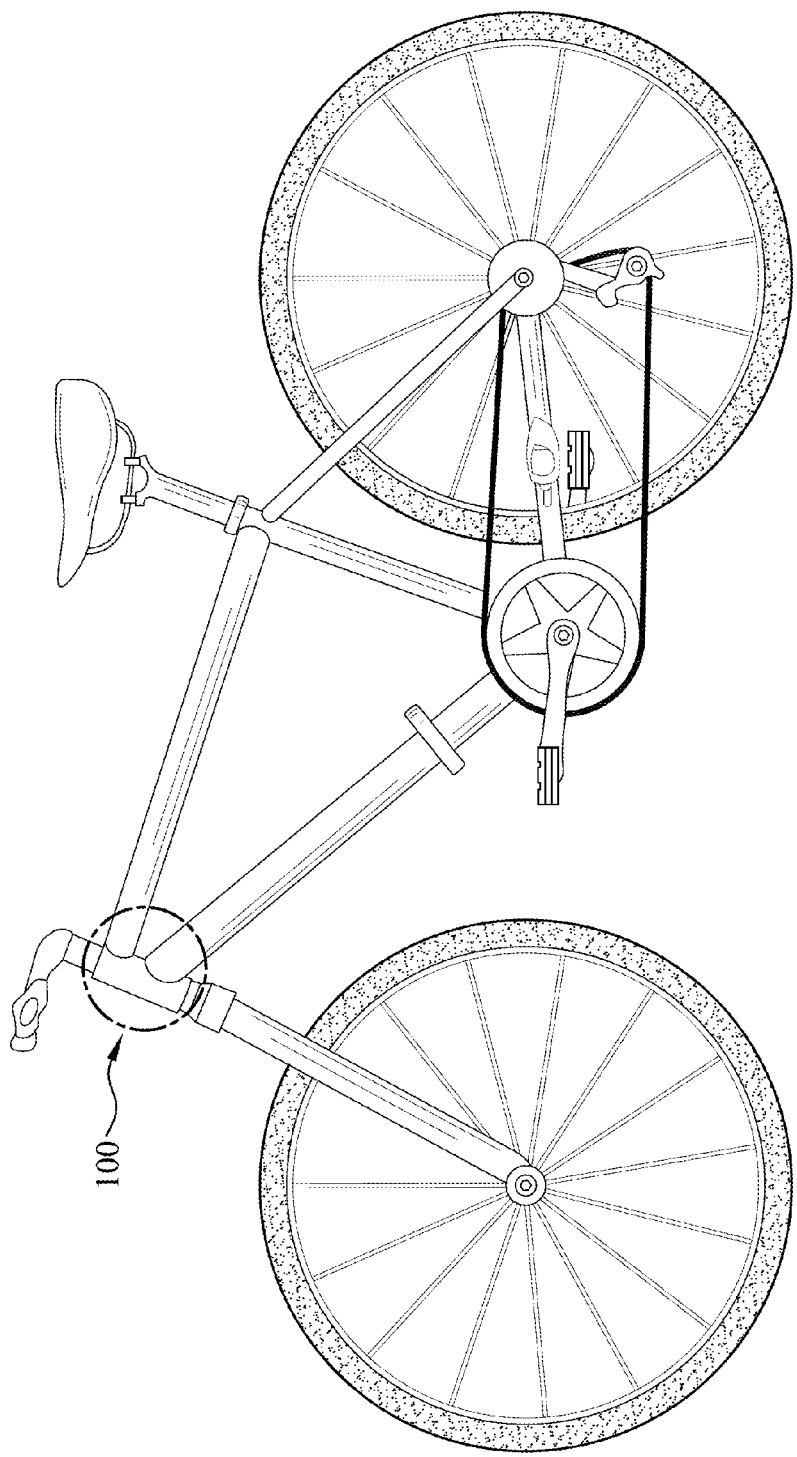
FIG. 1 is a schematic view illustrating the bicycle component applied to a bicycle front pipe.
Figure 2:
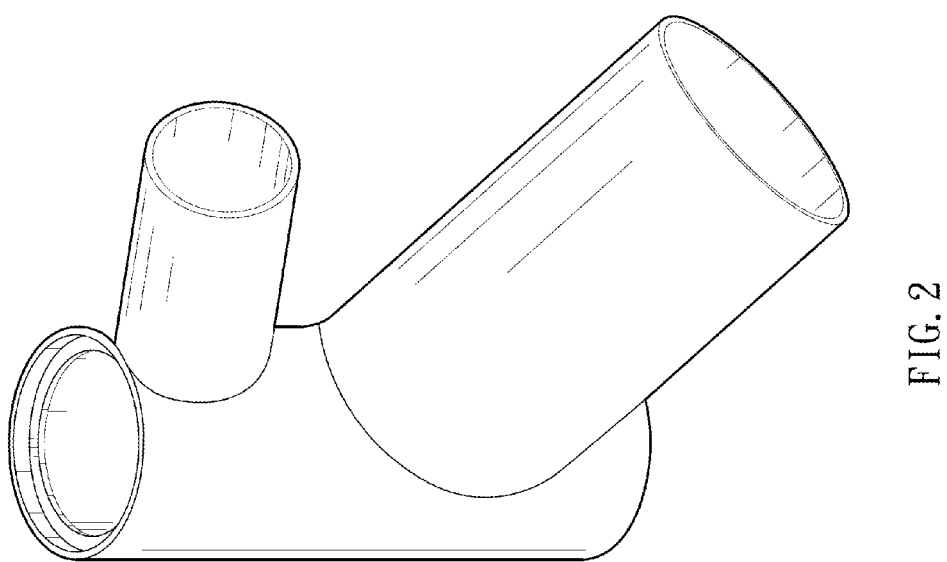
FIG. 2 is a perspective view of the bicycle component with reinforced structure in accordance with the present invention.
Figure 3:
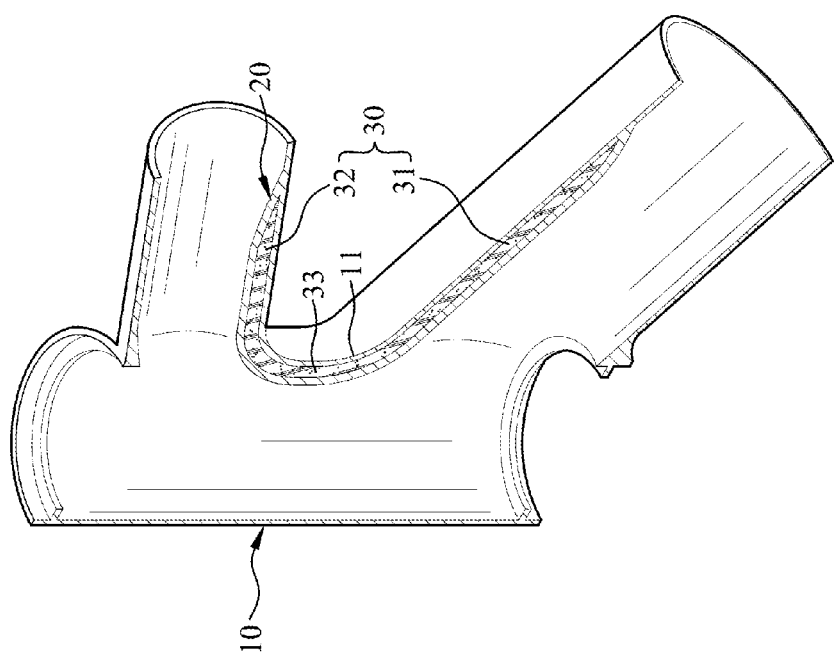
FIG. 3 is a sectional view of the bicycle component with reinforced structure in accordance with the present invention.
Figure 4:
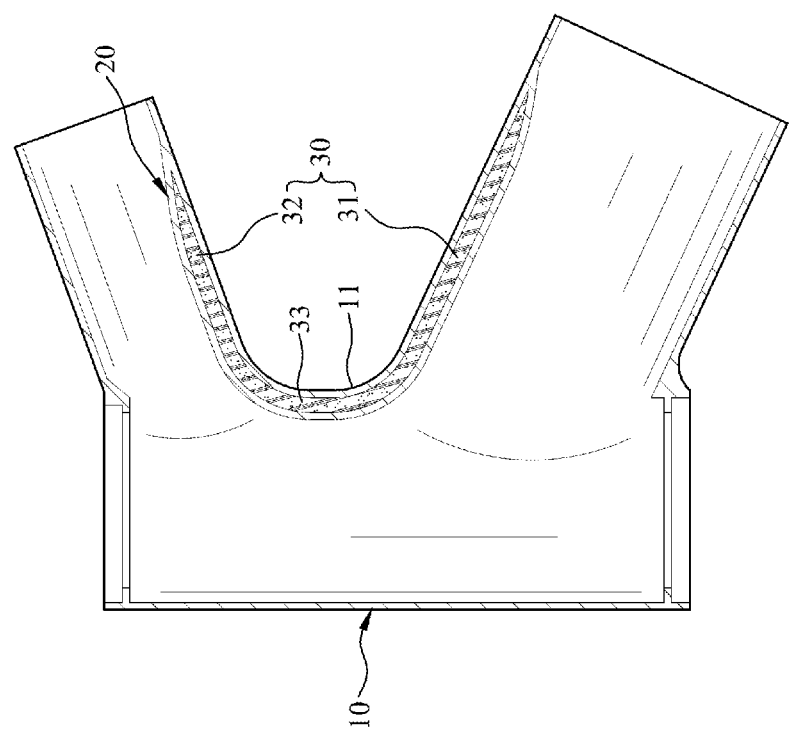
FIG. 4 is a second sectional view of the bicycle component with reinforced structure in accordance with the present invention.

The aforementioned and further advantages and features of the present invention will be understood by reference to the description of the preferred embodiment in conjunction with the accompanying drawings where the components are illustrated based on a proportion for explanation but not subject to the actual component proportion.

Referring to FIG. 1 to FIG. 4, the present invention provides a bicycle component 100 with reinforced structure, comprising a main body 10, and a foam material 30.

The main body 10 is hollow and manufactured by stacking plural carbon fiber prepreg layers 20. Also, the main body 10 is provided with an arc-shaped force bearing area 11. In the embodiment provided by the present invention, the main body 10 is allowed to be a front pipe, a handlebar and a frame.

The foam material 30, which is solid, is disposed on the force bearing area 11 and wrapped by the carbon fiber prepreg layers 20. Moreover, the foam material 30 is provided with a first end 31, a second end 32, and an arc section 33 between the first end 31 and the second end 32. The first end 31 and the second end 32 are both in a taper shape. The arc section 33 overlaps with the force bearing area 11.

In the molding process of the main body 10, the preformed foam material 30 is placed on the force bearing area 11 of the main body 10 and then wrapped by the carbon fiber prepreg layers 20, so that the foam material 30 is prevented from exposing outward. Next, the bicycle component 100 is formed by hot-pressing and blow molding process, whereby the structure of the force bearing area 11 of the bicycle component 100 is structurally strengthened.

Therefore, compared with the conventional structure, the force bearing area 11 of the present invention saves excessive usage of the carbon fiber composites, thus reducing the cost of material and decreasing the weight of the whole component. Also, the moment of inertia of the bicycle component 100 is prevented from increasing, such that the controllability of the bicycle made of the bicycle component 100 is enhanced.

Figure 5:
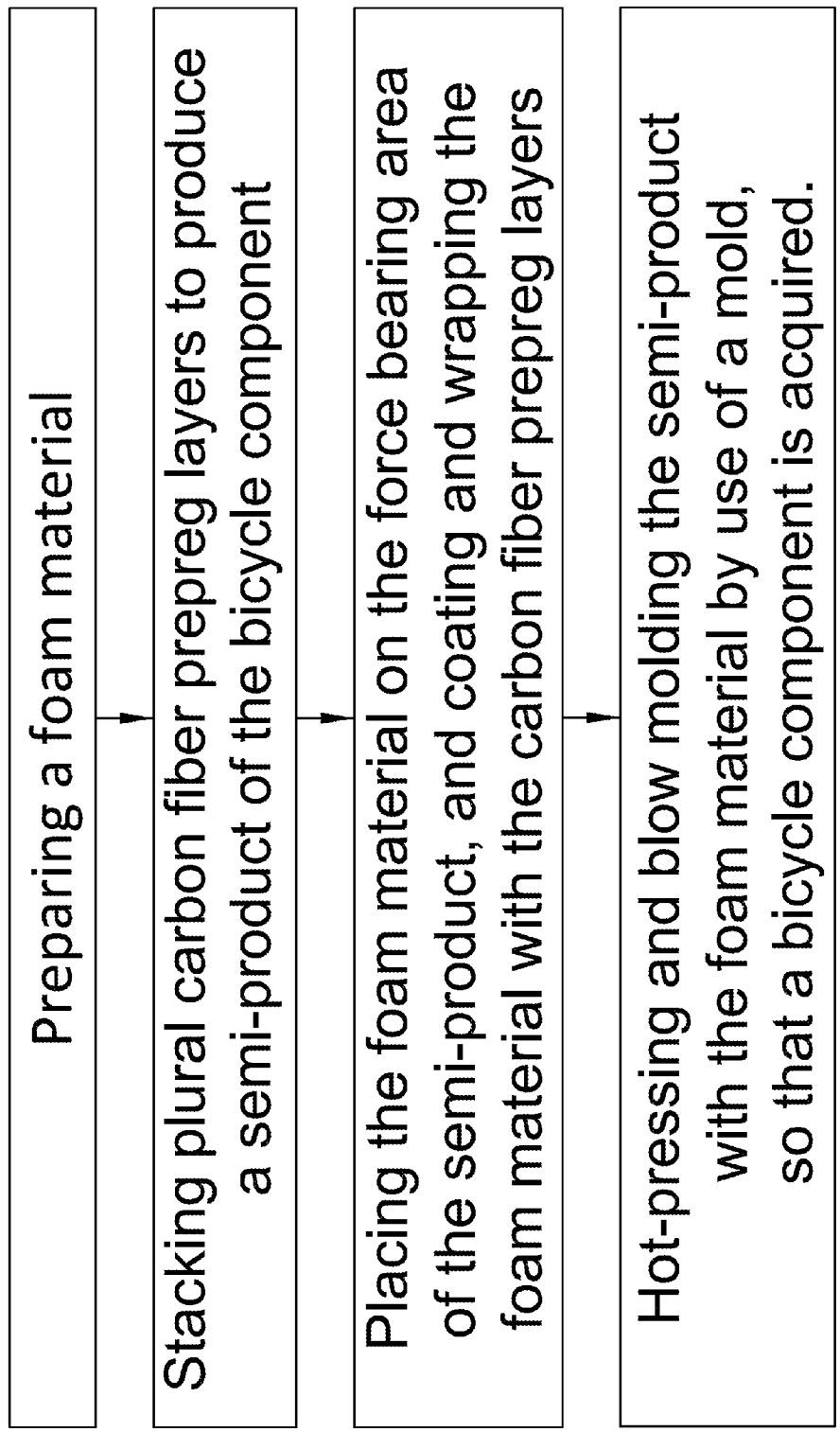
FIG. 5 is a flow chart of the manufacturing method of the bicycle component with reinforced structure in accordance with the present invention.

Referring to FIG. 5 which is a flow chart illustrating the manufacturing method of the bicycle component 100, the manufacturing method of the bicycle component 100 with reinforced structure comprises following steps:

a. preparing a foam material 30 which is solid;

b. stacking plural carbon fiber prepreg layers 20 to produce a semi-product of the bicycle component having an arc-shaped force bearing area 11;

c. placing the foam material 30 on the force bearing area 11 of the semi-product and coating and wrapping the foam material 30 with the carbon fiber prepreg layers 20; and d. hot-pressing and blow molding the semi-product with the foam material 30 by use of a mold, so that a bicycle component 100 is acquired.

In sum, the present invention provides a bicycle component 100 with reinforced structure manufactured by post-forming, so as to adopt the foam material 30 as a reinforcement construction. Therefore, the structural strength of the bicycle component 100 is improved without increasing the thickness with carbon fiber composites, such that the bicycle component 100 is lightened and provided with greater controllability.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A bicycle component with reinforced structure, comprising:

a hollow main body, manufactured by stacking plural carbon fiber prepreg layers and provided with a force bearing area; and a foam material, disposed on the force bearing area and wrapped by the carbon fiber prepreg layers.

2. The bicycle component with reinforced structure of claim 1, wherein the force bearing area is in an arc shape.

3. The bicycle component with reinforced structure of claim 2, wherein the foam material is provided with a first end, a second end, and an arc section between the first end and the second end, wherein the arc section overlaps with the force bearing area.

4. The bicycle component with reinforced structure of claim 3, wherein the first end and the second end are both in a taper shape.

5. The bicycle component with reinforced structure of claim 1, wherein the foam material is solid.

* * * * *